(12) United States Patent
Lang

(10) Patent No.: US 7,504,260 B1
(45) Date of Patent: Mar. 17, 2009

(54) METHOD AND APPARATUS FOR CONTROLLING GAS TEMPERATURES ASSOCIATED WITH POLLUTION REDUCTION PROCESSES

(76) Inventor: Fred D. Lang, 12 San Marino Dr., San Rafael, CA (US) 94901

( * ) Notice: Subject to any disclaimer, the term of this patent is extended or adjusted under 35 U.S.C. 154(b) by 872 days.

(21) Appl. No.: 10/892,737

(22) Filed: Jul. 15, 2004

Related U.S. Application Data

(63) Continuation-in-part of application No. 09/860,277, filed on May 16, 2001, now abandoned.

(60) Provisional application No. 60/205,716, filed on May 19, 2000, provisional application No. 60/204,919, filed on May 16, 2000.

(51) Int. Cl.
  *G01N 31/10* (2006.01)
  *G05D 23/13* (2006.01)
  *B01D 53/56* (2006.01)
  *F01N 3/18* (2006.01)

(52) U.S. Cl. ............... 436/55; 422/108; 422/109; 422/110; 422/111; 422/168; 422/173; 436/37

(58) Field of Classification Search ......... 422/108–111, 422/168, 173, 175; 436/37, 55
See application file for complete search history.

(56) References Cited

U.S. PATENT DOCUMENTS

| | | | | |
|---|---|---|---|---|
| 2,170,351 A | * | 8/1939 | Junkins | 122/1 B |
| 3,774,396 A | * | 11/1973 | Borsi et al. | 60/645 |
| 3,818,872 A | * | 6/1974 | Clayton et al. | 122/406.4 |
| 3,910,236 A | * | 10/1975 | Merritt, Jr. | 122/421 |
| 3,932,586 A | * | 1/1976 | Guerrieri | 423/243.08 |
| 4,106,286 A | * | 8/1978 | Sakai et al. | 60/39.182 |
| 4,160,009 A | | 7/1979 | Hamabe | |
| 4,173,949 A | * | 11/1979 | Roethe | 122/1 C |
| 4,206,722 A | * | 6/1980 | Nolley, Jr. | 122/1 A |
| 4,297,319 A | * | 10/1981 | Ishibashi et al. | 422/114 |
| 4,318,366 A | * | 3/1982 | Tompkins | 122/20 B |
| 4,466,241 A | * | 8/1984 | Inui et al. | 60/39.182 |
| 4,572,110 A | * | 2/1986 | Haeflich | 122/7 R |
| 4,999,167 A | | 3/1991 | Skelley et al. | |

(Continued)

FOREIGN PATENT DOCUMENTS

EP    0326388    8/1989

OTHER PUBLICATIONS

Wiener & Tanaka, "The Hitachi Zosen NOx Removal Process for Fossil Fueled Boilers", Air Pollution Control Assoc., 1982 Conf., 82-53.3, 16pp.

(Continued)

*Primary Examiner*—Arlen Soderquist

(57) ABSTRACT

This invention relates to a method and apparatus for controlling the temperature of combustion gases entering a pollution reduction process when such a process is applied to a steam generator burning fossil fuel having at least one heat exchanger. Improved operation of the pollution reduction process is achieved by controlling the temperature of combustion gases entering such a process through changes in the working fluid being heated by the combustion gases. This invention is applicable to all pollution reduction processes as associated with the combustion of fossil fuels, said processes being sensitive to the temperature of the combustion gases, said processes typically include $NO_X$ reduction processes, $SO_X$ reduction processes, and any pollution reduction process which employs a catalysis.

11 Claims, 3 Drawing Sheets

U.S. PATENT DOCUMENTS

| | | | |
|---|---|---|---|
| 5,206,002 A | * | 4/1993 | Skelley et al. ............... 423/235 |
| 5,282,355 A | * | 2/1994 | Yamaguchi ................. 60/39.5 |
| 5,500,194 A | * | 3/1996 | Bell ........................ 423/239.1 |
| 5,775,266 A | * | 7/1998 | Ziegler ...................... 122/7 R |
| 5,953,898 A | * | 9/1999 | Dryden ........................ 60/781 |
| 5,985,222 A | | 11/1999 | Sudduth et al. |
| 6,055,803 A | * | 5/2000 | Mastronarde ............... 60/783 |
| 6,347,511 B1 | | 2/2002 | Haines |

OTHER PUBLICATIONS

Thomas C. Elliot, "Standard Handbook of Powerplant Engineering", McGraw-Hill Publishing Company, New York: 1989, p. 1.15.

"Mark's Standard Handbook for Mechanical Engineers", Mc-Graw-Hill Book Company, New York: 1978, 8th Edition, Theodore Baumeister, Editior-in-Chief; pp. 9-23 to 9-24.

* cited by examiner

METHOD AND APPARATUS FOR CONTROLLING GAS TEMPERATURES ASSOCIATED WITH POLLUTION REDUCTION PROCESSES

CROSS-REFERENCE TO RELATED APPLICATIONS

This application is a Continuation-In-Part of U.S. patent application Ser. No. 09/860,277 filed May 16, 2001 now abandoned, by the same inventor, now abandoned, for which priority is claimed and is incorporated herein by reference in its entirety and for all purposes.

Application Ser. No. 09/860,277 claims benefit of priority of U.S. Provisional Application No. 60/204,919 filed May 16, 2000, and U.S. Provisional Application No. 60/205,716 filed May 19, 2000, all by the same inventor, the disclosures of which are incorporated herein by reference in their entirety and for all purposes.

FIELD OF THE INVENTION

This invention relates to a method and apparatus for controlling the temperature of combustion gases entering a pollution reduction process when such a process is applied to a steam generator burning fossil fuel having at least one heat exchanger. Improved operation of the pollution reduction process is achieved by controlling the temperature of combustion gases entering such a process through changes in the working fluid being heated by the combustion gases. This invention is applicable to all pollution reduction processes as associated with the combustion of fossil fuels, said processes being sensitive to the temperature of the entering combustion gases, said processes typically include $NO_X$ reduction processes, $SO_X$ reduction processes, and any pollution reduction process which employs a catalysis.

BACKGROUND OF THE INVENTION

The production of nitrogen oxide compounds (commonly termed $NO_X$), sulfur oxide compounds (commonly termed $SO_X$) and mercury from the combustion of fossil fuels, and especially coal, are sources of "pollution" (defined below). All of these, and others, are hazards to health and are controlled by many government environmental agencies throughout the world. Such control may result in reduced thermal or electrical output from the system. To reduce such pollutants, thus improving the environment and preventing reduced system output, a number of chemical processes have been developed. These processes are placed directly in the combustion gas stream, and may involve the injection of certain chemicals and/or the use of chemically reactive substances and/or the use of a catalysis. Most of these processes require a "temperature window" within the gaseous stream to function at their intended efficiencies. This invention controls the inlet temperature of this window, thus allowing for improved efficiency of such processes.

A $NO_X$ reduction process has been developed by NOxTech, Inc., Irvine, Calif. (www.NOxTech.com). Their process is applicable to a steam generating plant burning fossil fuels including coal. The NOxTech process, is disclosed in U.S. Pat. No. 5,985,222 issued Nov. 16, 1999, and operates by increasing combustion gas temperature by adding fuel and $NO_X$ reduction chemicals between heat exchangers. The added fuel is intended to burn lean in an auto-thermal manner promoting reducing reactions with $NO_X$ compounds. The placement of such injected fuel and chemicals in the system is chosen such that the combustion gases are, ideally, between 1440 to 1550 F before injection. A modification of this process, termed "NOxStar" is available from Mitsui Babcock Ltd., Crawley, West Sussex, United Kingdom (www.MitsuiBabcock.com), also from their subsidiary Mitsui Babcock (US) LLC, Atlanta, Ga.

Another $NO_X$ reduction process has been developed by Fuel Tech, N.V. of Stamford, Conn. and Batavia, EL (www-.FuelTechNV.com). The Fuel Tech processes, as applied to a fossil-fired steam generator, typically operates within a temperature window whose variability is ideally controlled within 25 AF for highest $NO_X$ reductions. Fuel Tech's processes are protected by a number U.S. Pat. Nos. 5,728,357 issued Mar. 17, 1998; 5,658,547 issued Aug. 19, 1997; and 5,616,307 issued Apr. 1, 1997.

$SO_X$ (i.e., $SO_2$ and $SO_3$) pollution control equipment involves dry or wet "scrubbing", or chemical reduction involving catalytic processes. Wet scrubbing typically involves bring combustion gases into contact with a limestone-water slurry producing gypsum. Dry scrubbing typically involves the injection of a dry reagent such as lime or activated carbon into the combustion gas stream. For dry scrubbing the reagent is typically added in a recirculating type reactor with cooled combustion gases (the cooled gases are needed for high absorption efficiency); the sulfur bearing particulate is then recovered downstream using a bag house filtering process. Wet scrubbing is not overly sensitive to combustion gas temperatures. However, dry scrubbing processes have temperature limitations and typically require the control of combustion gas temperatures. Prior to this invention, such temperature control was achieved through the by-passing of combustion gases. $SO_X$ and mercury reduction by catalytic processes are well known to the oil refining industry, and have been applied to fossil combustion in conventional steam generators. Such catalytic processes are sensitive to the medium's temperature and require control. As examples of $SO_2$ reduction technology, refer to U.S. Pat. Nos. 4,469,589 issued Sep. 4, 1984 and 4,790,982 issued Dec. 13, 1988.

To allow these processes to operate at their optimum temperature windows the current practice in the steam generation industry is to either modify a heat exchanger's surface area, or physically relocate a heat exchanger within the steam generator, or to by-pass combustion gasses in such a manner as to achieve temperature control. All of these measures, heat exchanger modifications or changes in the path of combustion gas streams, results in the redistribution of energy flows to achieve a desired temperature window. Ideally such modifications result in normal thermal output (e.g., steam flow) without penalty to system thermal efficiency. However, such heat exchanger surface area or relocation modifications are expensive, and are not considered practical for all steam generator designs. Any physical alternation to a heat exchanger, including, for example, any change to heat transfer surface areas or changes in heat exchanger location within the steam generator, are not considered part of this invention and have no applicability to this invention. If such equipment modifications are not practical, current practice may dictate a degradation in system thermal efficiency. For example, use of the NOxStar process offered from Mitsui Babcock may cause higher combustion gas temperatures exiting the steam generator. In general, for every 40 ΔF higher exiting gas temperature, boiler efficiency (η) degrades by 1% Δη, which is to be avoided if possible.

Such temperature windows must be maintained throughout the thermal loading of the system. As a system's load changes, combustion gas temperatures may change. This is especially true with coal-fired steam generation systems where the combustion air's forced draft fans are typically keep at a constant speed, thus the system's Air/Fuel ratio increases with reduce fuel flow causing a disproportionate decrease in combustion gas temperatures. This situation, and low load operation in general, places additional burden on the design of any equipment modification intended to maintain a temperature window for pollution reduction processes.

This invention is not similar to superheat or reheater sprays, commonly used to adjust exiting steam temperatures produced from steam generators. Such sprays are used to control final steam temperatures typically delivered to the Regenerative Rankine Cycle or to any industrial process. Rather, it teaches an alternative approach to achieve an improved use of pollution reduction processes in a steam generator. There is no known art applicable to the present invention.

SUMMARY OF THE INVENTION

This invention teaches that a portion of a steam generator's working fluid can be re-routed to produce a desired temperature window for pollution reduction processes. Such re-routing includes control of the re-routed flow based on the desired combustion gas temperature local to the pollution reduction process. If properly designed, application of this invention has demonstrated that no degradation in system thermal efficiency need be realized.

This invention is applicable to any fossil-fired system which is adding an energy flow from combustion gases to a working fluid, said working fluid confined within heat exchanger tubes. A common example is steam production caused by heating water via hot combustion gases flowing around heat exchanger tubes, the hot combustion gases produced from burning fossil fuels. In the context of this invention, said systems utilize a pollution reduction process to clean its combustion gases. The purpose of such working fluid (e.g., steam) generation can be for expansion in steam turbines as part of a Regenerative Rankine Cycle, and/or used in any industrial process which extracts energy from a vaporized working fluid, returning that fluid as a condensed liquid to the working fluid generator.

DESCRIPTION OF THE PREFERRED EMBODIMENTS

The preferred embodiment of this invention involves a sequence of engineering steps which first involves the identification of the required combustion gas temperature window, to then perform a systemic study how that gas temperature can be achieved through manipulation of working fluid flows including study of low load operation and its impact on the pollution reduction process, and finally to implement this invention using appropriate control technologies. This invention teaches that a portion of the working fluid can be routed from any location within the steam generator to any other, specifically to achieve a temperature window needed by a pollution reduction process.

To more fully teach the art of this invention, an example is herein provided. This example considers the routing of the steam generator's inlet feedwater from the Boiler Feed Pump (in much the same manner as liquid spray water is commonly used to control final steam temperature), and its injection into the working fluid at the inlet to the heat exchanger upstream from a pollution reduction process (such as a NOxStar process). This will reduce the temperature of the combustion gases entering the pollution reduction process. In the case of NOxStar's $NO_X$ reduction process which involves the injection of fuel into the combustion gas stream, note that whereas the combustion gas energy outlet from the upstream heat exchanger is reduced, it then is more amenable to the anticipated ≈100 ΔF increase from the added fuel. The net effect of the re-routed working fluid is to cause reduced thermal impact on heat exchangers downstream; and of course maintaining the steam generator's thermal load at a constant level. If required, multiple injections of feedwater can be made throughout the steam generator to achieve an adequate balance of thermal load and heat transfer, given the presence of a pollution reduction process.

Figure 1:
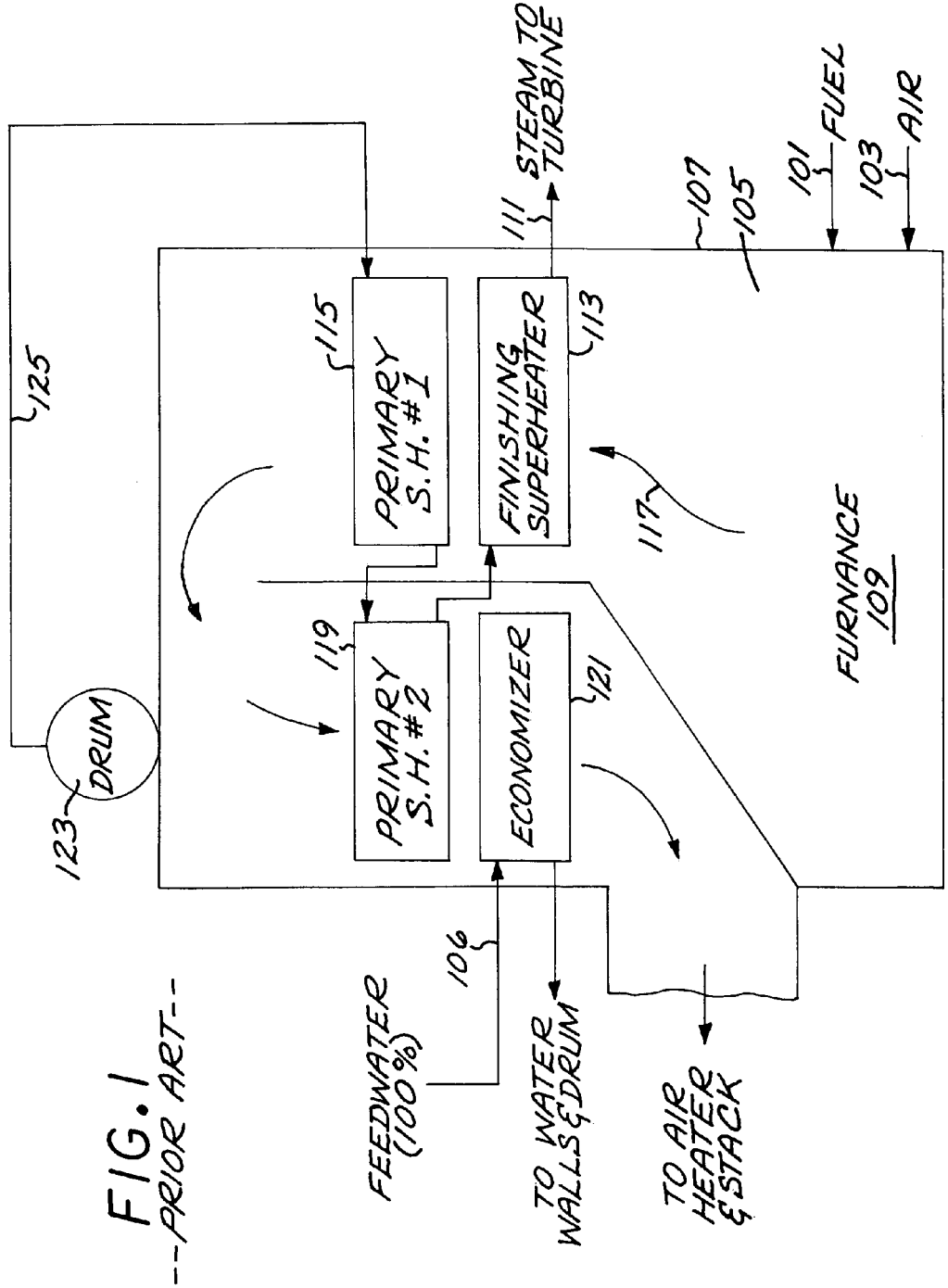
FIG. 1 illustrates a steam generator of conventional design and firing a fossil fuel, it is an example of prior art.

See FIG. 1 for a schematic representation of a conventionally designed, fossil-fired steam generator, without use of a pollution reduction process. FIG. 1 represents prior art. Depicted is a typical steam generator configuration, being fired in the Furnace region with a fossil fuel producing hot combustion gases. For example, in this arrangement feedwater enters the steam generator at its Economizer and is heated by the combustion gases. It is then routed to the steam generator's water walls and drum, acquiring additional energy flow from the combustion gases. Saturated vaporous steam is collected at the drum, the working fluid then being routed to the Primary Superheater # 1. After further heating in Primary Superheater # 1 it is then routed to Primary Superheater #2. After the Primary Superheater #2, the working fluid is then routed to the Finishing Superheater. After further heating in the Finishing Superheater, the working fluid is then supplied, typically as superheated steam, to a process (e.g., a Regenerative Rankine Cycle or to any other energy extracting processes). There are of course numerous variations in steam generator design, whose art has been known for over 100 years. For example, descriptions of various steam generator designs are presented in the following publication: *Steam, Its Generation and Use,* 40th Edition, Edited by S. C. Stultz and J. B. Kitto, published by The Babcock & Wilcox Company, Barberton, Ohio; see especially its Chapters 24 through 31. All of these steam generators are considered conventional designs, burning fossil fuels, use water as the working fluid flowing through heat exchanger tubes, and are all amenable to the methods and apparatus of this invention when these steam generators employ pollution reduction processes. A "pollution reduction process" is herein defined as any process which removes pollutants from the products of fossil fuel combustion; typically said pollution reduction process involves removing pollutants from combustion gases.

Figure 2:
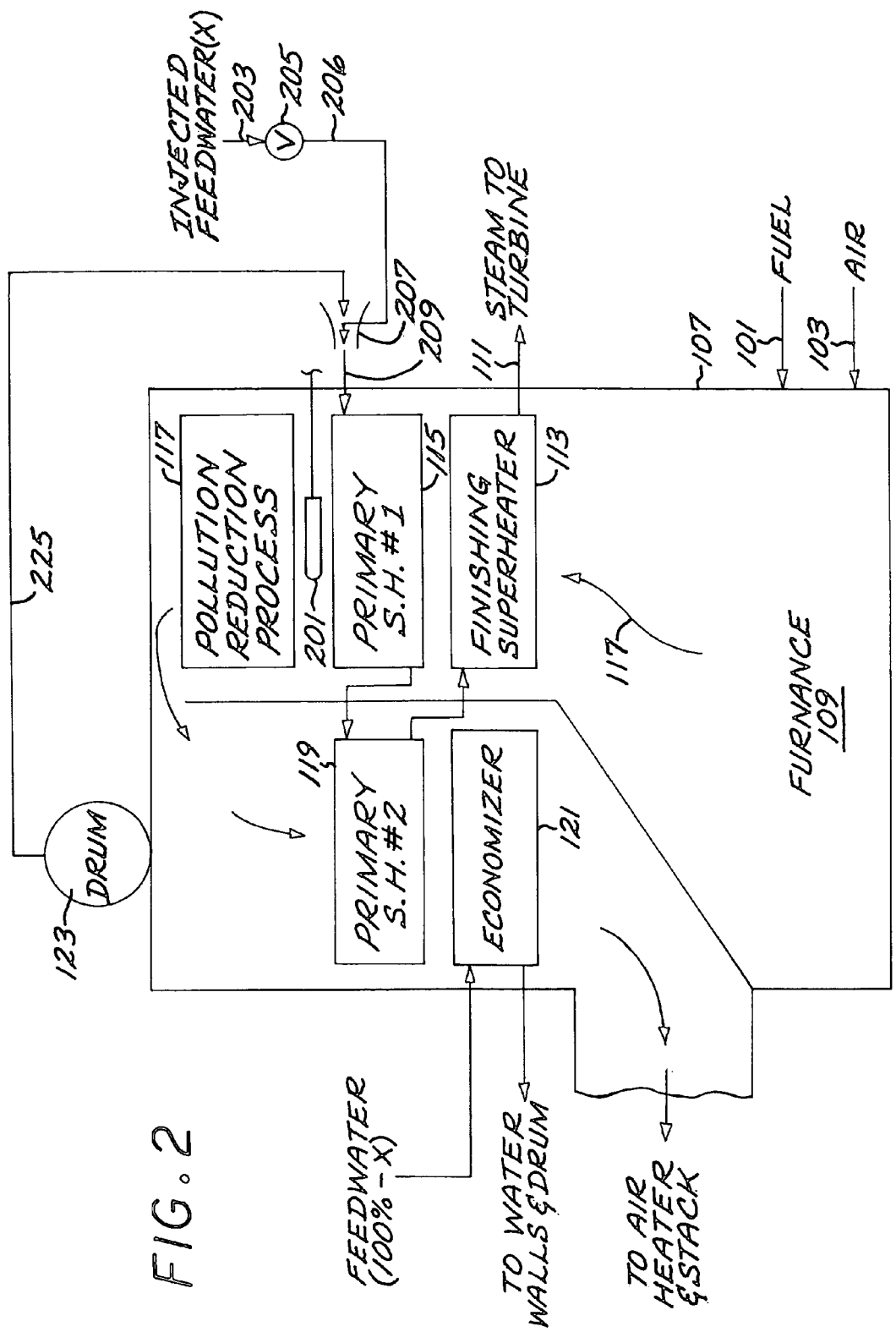
FIG. 2 illustrates a steam generator using a pollution reduction process in conjunction with the advantages of this invention.
Figure 3:
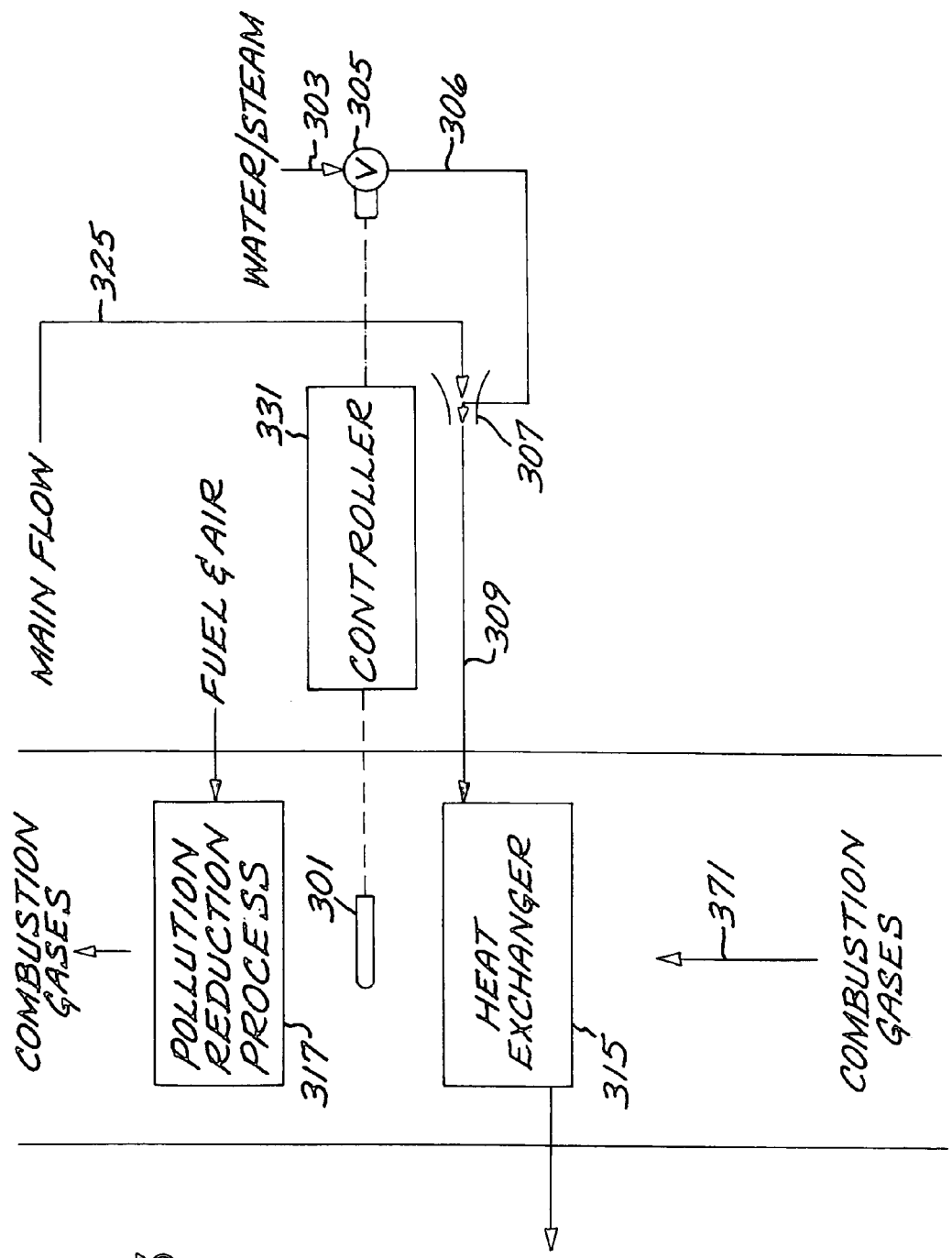
FIG. 3 illustrates the temperature control apparatus of this invention.

FIG. 2 illustrates the application of this invention. Note that a portion of the feedwater, denoted by "X", is routed from the feedwater stream before it enters the steam generator, directly to the inlet of the Primary Superheater # 1. As discussed above, the proportion of feedwater "X" cools the working fluid entering the Primary Superheater #1, thus reducing the exiting combustion gas temperature before it enters the pollution reduction process. The control of the injected feedwater is illustrated in FIG. 3. In FIG. 3, a motor-operated valve is controlled on combustion gas temperature such that the desired gas temperature downstream of the cooled heat exchanger is automatically adjusted to the desired inlet temperature required by the pollution reduction process.

Further, a similar arrangement could be applied, for example, to Primary Superheater #2 with a controlling temperature probe locate within the combustion gas stream exiting from the system (i.e., the smoke stack). This gas exit temperature could be controlled by water injected into an upstream heat exchanger (for example the Primary Superheater #2). This arrangement would thus achieve control of stack temperature, and thus have a principle controlling influence on boiler efficiency. Alternatively, such temperature control of combustion gases may be applied to any location within the steam generator, including the gas temperature entering a pollution reduction process. Further, such injected water need not be cold liquid water obtained before the feedwater enters the steam generator (as exampled). Such water, liquid or steam, could be obtained from any heat exchanger. For example, such water could be obtained from the outlet of the Economizer and routed to the inlet of the Primary Superheater #2. Note that by the term "temperature probe" is meant a temperature sensing instrument including, but not limited to, one of the following or their functional equivalent: a thermocouple; a Type K thermocouple; a Type E thermocouple; a Resistance Temperature Detector, also termed RTD; and an infrared based detector for measuring temperature.

To further explain this invention, TABLE 1 illustrates computed mass/energy balances associated a conventionally fired steam generator of FIG. 1, in which a pollution reduction process is not employed. TABLE 2 illustrates computed mass/energy balances of the exampled system but one which employs a NOxStar process designed by Mitsui Babcock, using re-routed feedwater cooling of Primary Superheater #1. Note that this NOx reduction process simulates a 104 ΔF rise in combustion gas temperature (given its need to inject fuel), while the inlet to Primary Superheater #1 is cooled using 2% re-routed feedwater flow (producing an inlet condition of 97.26% quality, and not the normal 100% quality). In TABLES 1 and 2: "AIR" refers to an Air-Preheater exchanger; "Econ" refers to an Economizer heat exchanger; "PSH 1" & "PSH 2" refers to Primary Superheater #1 & #2 heat exchangers; "FinSH" refers to a Finishing Superheater heat exchanger; and "Boiler" refers to the steam generator's collection of water wall heat exchangers and the steam generator's drum. All such steam generator heat exchangers should be considered typical and do not limit the scope or applicability of this invention. The fundamentals of such mass/energy balances are well-known to any mechanical engineer, such that they conserve working fluid and combustion gas mass and energy flows as required by the First Law of Thermodynamics for a system assumed at steady state. Specifically, TABLES 1 and 2 were prepared using the EX-FOSS program, a computer program for the simulation of steam generators (referenced below). Note that the ability to compute mass/energy balances of the working fluid and the combustion gas, including temperature profiles as presented in TABLES 1 and 2, are considered typical of those produced by many simulation programs of steam generators.

In TABLES 1 and 2 the nomenclature in the first five columns refers to combustion air or working fluid conditions. For example, in TABLE 1, "Econ-in" refers to conditions associated with an Economizer heat exchanger using 786000 lbm/hr of working fluid flowing through its heat exchanger tubes with inlet conditions of 1430.0 psiA pressure, 425.0 F temperature and 403.38 Btu/lbm enthalpy, this working fluid exits the Economizer ("-out") at 1415.0 psiA pressure, 541.0 F temperature and 536.86 Btu/lbm enthalpy; combustion gases enter the Economizer at 999.5 F and exit (after heating the working fluid) at 602.9 F. Again, in these tables "AIR" refers to the Air PreHeater and corresponding moist air conditions; all other components referenced in these tables are working fluid heat exchangers with the exception of the "NOxStar" component which simulates the effects of a pollution reduction process. "NOxStar" is passive in TABLE 1 (i.e., no change in combustion gas temperatures as observed), but is considered in-service in TABLE 2. In these tables "Qual" refers to thermodynamic quality (e.g., 1.0=>saturated vapor, 0.0=>saturated liquid).

The EX-FOSS program used to generate the data in TABLES 1 and 2 is commercially available from Exergetic Systems, Inc. of San Rafael, Calif. (www.ExergeticSystems.com). Another such computer program for the simulation of steam generators is the PROATES program commercially available from PowerGen UK of Nottingham, United Kingdom; PROATES is also available through PowerGen's subsidiary Power Technology (www.PowerTech.co.uk). There are numerous other such programs used within the steam generator industry; essentially every manufacturer of commercial steam generators has such a program used for design and modification studies. The methods of using these simulation programs are discussed below as method embodiments.

TABLE 1

Combustion Gas Temperatures Without a Pollution Reduction Process

| ID of Heat Exchanger | Air or W.F. Flow Rate (lbm/hr) | Air or W.F. Pressure (psiA) | Air or W.F. Temp. (deg-F.) | Air or W.F. Enthalpy (Btu/lbm) | Gas Temp. (deg-F.) |
|---|---|---|---|---|---|
| AIR-in | 841787 | 14.70 | 80.0 | 26.10 | 300.0 |
| -out | 841787 | 14.70 | 450.0 | 117.25 | 602.9 |
| Econ-in | 786000 | 1430.0 | 425.0 | 403.38 | 602.9 |
| -out | 786000 | 1415.0 | 541.0 | 536.86 | 999.5 |
| PSH 2-in | 786000 | 1395.0 | 714.0 | 1306.0 | 999.5 |
| -out | 786000 | 1375.0 | 840.0 | 1395.4 | 1254. |
| NOxStar-in | 0 | 1000.0 | Qual = 1.0 | 1192.1 | 1254. |
| -out | 0 | 1000.0 | Qual = 0.0 | 542.40 | 1254. |
| PSH 1-in | 786000 | 1415.0 | Qual = 1.0 | 1172.9 | 1254. |
| -out | 786000 | 1395.0 | 714.0 | 1306.0 | 1620. |
| FinSH-in | 786000 | 1375.0 | 840.0 | 1395.4 | 1620. |
| -out | 786000 | 1350.0 | 950.0 | 1464.9 | 1805. |
| Boiler-in | 786000 | 1415.0 | 541.0 | 536.86 | 1805. |
| -out | 786000 | 1415.0 | Qual = 1.0 | 1172.9 | 3346. |

This example employed reduced fuel to the furnace region (see FIG. 2, item 109) in anticipation of further fuel being added through the NOxStar process, thus maintaining a constant thermal load. This situation assumed that the Air/Fuel ratio inlet at the furnace region would be reduced given reduced fuel. If the combustion air flow to the furnace region is reduced proportionally with the fuel's reduction, and additional air is introduced downstream (e.g., directly at the NOxStar process, or even further downstream from it), then the steam generator's thermal balance is not materially altered given a constant local Air/Fuel ratio, and that both the NOxStar fuel and re-routed working fluid are injected at appropriate points in the system. With appropriate Air/Fuel ratios, NOxStar fuel and working fluid injections, the steam generator regions would perform as normal, achieving the desired net thermal load given constant heat transfer effects anywhere in the system.

TABLE 2

Combustion Gas Temperatures With a
Pollution Reduction Process ("NOxStar")

| ID of Heat Exchanger | Air or W.F. Flow Rate (lbm/hr) | Air or W.F. Pressure (psiA) | Air or W.F. Temp. (deg-F.) | Air or W.F. Enthalpy (Btu/lbm) | Gas Temp. (deg-F.) |
|---|---|---|---|---|---|
| AIR-in | 841800 | 14.70 | 80.0 | 26.10 | 300.0 |
| -out | 841800 | 14.70 | 450.0 | 117.25 | 602.9 |
| Econ-in | 770000 | 1430.0 | 425.0 | 403.38 | 602.9 |
| -out | 770000 | 1415.0 | 541.0 | 536.86 | 991.6 |
| PSH 2-in | 786000 | 1395.0 | 679.0 | 1277.3 | 991.6 |
| -out | 786000 | 1375.0 | 840.0 | 1395.4 | 1327. |
| NOxStar-in | 45000 | 1000.0 | Qual = 1.0 | 1192.1 | 1327. |
| -out | 45000 | 1000.0 | Qual = 0.0 | 542.40 | 1223. |
| PSH 1-in | 786000 | 1415.0 | Qual = .9726 | 1157.2 | 1223. |
| -out | 786000 | 1395.0 | 679.0 | 1277.3 | 1555. |
| FinSH-in | 786000 | 1375.0 | 840.0 | 1395.4 | 1555. |
| -out | 786000 | 1350.0 | 950.0 | 1464.9 | 1741. |
| Boiler-in | 770000 | 1415.0 | 541.0 | 536.86 | 1741. |
| -out | 770000 | 1415.0 | Qual = 1.0 | 1172.9 | 3262. |

An additional advantage is derived from this invention provided: 1) the steam generator is supplying steam to a Regenerative Rankine Cycle having feedwater heaters; 2) the working fluid is obtained from the feedwater's pump (termed the Boiler Feed Pump, or BFP); and 3) the BFP is upstream from the highest pressure feedwater heater (i.e., termed the "top heater"). Given such a situation, extraction flow to the top heater is reduced since its tube-side flow is reduced (i.e., 100%-X, see FIG. 2), thus more flow is delivered to the downstream steam turbines (typically the intermediate and low pressure turbines) leading to higher power production. This situation means a higher saturation temperature at the top heater, and given a reduced tube-side flow, results in improved heat transfer at the top heater. This results in higher power being generated for the same total fuel energy flow. Changes in boiler efficiency are small, given that essentially the same stack temperature will result given the same total thermal loading is placed on the steam generator. Thus, given a higher power generation from a Regenerative Rankine Cycle, but with a constant fuel energy flow supply, the overall system thermal efficiency will improve.

The placement of a pollution reduction process could require higher combustion gas temperatures than normal without a pollution reduction process. As taught by this invention, one means of obtaining higher combustion gas temperatures may be achieved through the by-passing of a portion of working fluid around one or more heat exchangers. Typically the heat exchangers so by-passed would be immediately upstream of the pollution reduction process. The control of the gas temperature entering the pollution reduction process would be achieved through the amount of working fluid by-passed.

This invention has been taught by example, so far, through the example of using a portion of the feedwater before it enters the steam generator to adjust combustion gas temperatures through attemperation of its "as-designed heat exchanger working fluid flow" (defined below). Other sources of working fluid (e.g., liquid water and/or steam) might easily be adapted for such attemperation, provided, as for all cases, that the final exiting gas temperature from the steam generator (at the stack) is not adversely effected. For example, as discussed above, it may be that a portion of the water exiting the Economizer is routed to a higher energy heat exchanger to achieve the desired results. Such choices would become apparent by performing mass and energy balances throughout the system, re-routing liquid water and/or steam flows and varying their flow rates for advantageous heating or cooling of combustion gases; these things given a specific steam generator design and unique placement of a pollution reduction process. Such analysis methods are discussed in the following paragraphs. In the following discussions of method embodiments, it is understood that the end objective of such methods is to achieve the proper temperature window required by the pollution reduction process, while at the same time minimizing any adverse impact on the steam generator's exit gas temperature, and minimizing any adverse impact on system thermal efficiency.

First and Rudimentary Method Embodiments

A rudimentary, but viable, method which may be employed to implement this invention is to recognize that many power plants have, among their engineering staffs, personnel who have had years of experience specific to their systems. This is also true for the manufacturer of steam generators (i.e., vendors) as these firms have personnel who have had years of experience specific to their unique designs and their operational characteristics. Such experience should be supplemented with simple heat transfer calculations, calculations which may be performed either by computer or by hand (i.e., non-computer assisted). The general criteria for such simple calculations is to maintain a constant approach temperature and constant over-all heat transfer coefficient for each heat exchanger and associated re-routed working fluid. Approach temperatures (defined as the inlet combustion gas temperature minus the first working fluid temperature encountered by the combustion gas) are generally known to the experienced power plant or vendor engineer if he/she has performed detailed testing of the steam generator, measuring combustion gas and working fluid temperatures associated with major heat exchangers. This method embodiment may have limitations if departing markedly from the as-designed heat exchanger working fluid flow. Although the method discussed in this paragraph is not the preferred embodiment, it represents an example of a heat transfer study of the steam generator resulting in identification of a source and destination of a re-routed working fluid based on achieving the temperature window.

Another rudimentary method embodiment which may be employed is the use of trial and error routings of working fluid, supported by working fluid and combustion gas temperature measurements. Although alien to most analysts, this method embodiment has merit if the system is well understood by the power plant or vendor engineer, it tacitly recognizes that placement of routed working fluid piping is typically not expensive given the potential benefits. If a given routing is not successful, its piping may be welded closed or valved out-of-service. Given a good understanding of the system by the power plant or vendor engineer, this method is applicable if supported by some simple calculations (computer or hand). Typically a general criteria for such simple calculations is to maintain a constant approach temperature and constant over-all heat transfer coefficient for each heat exchanger. Although the method discussed in this paragraph is not the preferred embodiment, it represents another example of a heat transfer study of the steam generator resulting in identification of a source and destination of a re-routed working fluid based on achieving the temperature window.

Second Method Embodiment

Another method which may be employed to implement this invention is the use of the EX-FOSS computer program which simulates steam generators. TABLES 1 and 2 were produced from the EX-FOSS program. The power of a computer program lies with its inherent ease in simulating numerous re-routings of working fluid, thus arriving at an optimum design. When using EX-FOSS, heat transfer correlations may be normalized to actual data, using up to three sets of test data, assuring that perturbations from the as-designed heat exchanger working fluid flows are reasonably simulated. Such perturbations are studied using EX-FOSS in its Design Mode. The criteria for comparison between heat exchangers using their as-designed heat exchanger working fluid flows, and the situation of incorporating a pollution reduction process involving various re-routings of working fluid, lies with maintaining similar heat exchanger effectiveness parameters for all heat exchangers. When using EX-FOSS, heat exchanger effectivenesses are computed apart from EX-FOSS after a series of simulations are performed and results gathered. The use of EX-FOSS is the preferred embodiment when coupled with study of heat exchanger effectiveness for all heat exchangers, and represents vet another example of a heat transfer study of the steam generator resulting in identification of a source and destination of a re-routed working fluid based on achieving the temperature window.

Heat exchanger effectiveness is a well known concept to those skilled in the art; other words used for this same concept include: "heat transfer effectiveness" and "exchanger heat transfer effectiveness". Heat exchanger effectiveness is taught in the following text books: F. Kreith, *Principles of Heat Transfer,* $2^{nd}$ Edition, 1965, International Textbook Company, Scranton, Pennsylvania, pages 496-505; and W. M. Kays & A. L. London, *Compact Heat Exchangers,* $3^{rd}$ Edition, 1984, McGraw-Hill Book Company, New York, N.Y.

Third Method Embodiment

Yet another example of a heat transfer study leading to a re-routed working fluid based on achieving the temperature window is use of the PROATES computer program which simulates steam generators. When using PROATES, heat transfer correlations may be normalized using several sets of test data, assuring that perturbations from the as-designed heat exchanger working fluid flows are reasonably simulated. Such perturbations are studied after test data is normalized within the PROATES structure. The criteria for comparison between heat exchangers using their as-designed heat exchanger working fluid flow, and the situation of incorporating a pollution reduction process involving various re-routings of working fluid, lies with maintaining similar heat exchanger effectiveness parameters for all heat exchangers. Although PROATES requires specialized knowledge and training, it has improved heat transfer modeling when compared to EX-FOSS. Such improvements include detailed radiant heat transfer and approximations of three-dimensional heat exchanger geometries. Although many pollution reduction processes do not operate in the radiant region of steam generators, and point-dimensional approximations (used by EX-FOSS) are many times quite adequate, PROATES represents a viable simulator, and a proven simulator used throughout the steam generator industry.

Implementation of Methods

The general procedure to be followed with any computer simulator, including EX-FOSS and PROATES, involves seven steps. Preceding these seven steps is the step of identifying the pollution reduction process and obtaining its temperature window under which the process will function in an optimum manner. The seven steps include the following actions: 1) obtaining an arrangement of heat exchangers and common design parameters associated with the steam generator; 2) obtaining as-designed heat exchanger working fluid flows associated with each heat exchanger, and a fuel flow associated with the said as-designed heat exchanger working fluid flows; 3) determining a final combustion gas temperature exiting from the steam generator associated with as-designed heat exchanger working fluid flows (without incorporation of a pollution reduction process), resulting in a design stack temperature and a design system thermal efficiency; 4) choosing a computer program for simulation of the steam generator, the computer program being capable of producing at least a mass/energy balance of the working fluid and inlet & outlet combustion gas temperatures for each heat exchanger; 5) using the computer program to determine mass/energy balances of the working fluid and inlet & outlet combustion gas temperatures for each heat exchanger without the pollution reduction process; 6) using the computer program to determine a set of mass/energy balances of the working fluid and inlet & outlet combustion gas temperatures for each heat exchanger with incorporation of the pollution reduction process, each said set descriptive of a different re-routed working fluid flow and different flow rate of the re-routed working fluid chosen with the intent of achieving the temperature window of the pollution reduction process and the design system thermal efficiency, resulting in a matrix of operating configurations; and 7) selecting from the matrix of operating configurations which of the working fluid routings and flows best achieve the temperature window of the pollution reduction process and the design system thermal efficiency while at the same time maintaining reasonably constant at least one of the parameters or combination of parameters selected from the group of parameters or combination of parameters consisting of: the parameter of heat exchanger effectiveness for each heat exchanger, and the combination of parameters of approach temperature and over-all heat transfer coefficient for each heat exchanger (see the above sections entitled "First and Rudimentary Method Embodiments", "Second Method Embodiment" and "Third Method Embodiment" for descriptions of calculational procedures and computer programs which may be use to determine the aforementioned parameters used for said selecting).

The general procedure of the previous paragraph comprises within its step #6 the following additional steps: a) incorporating the pollution reduction process into the computer simulation at a location which is both physically possible and likely that its temperature window may be achieved; b) modifying the computer simulation by a re-routed working fluid routed from any location within the system (i.e., inside or outside the steam generator envelope) to an attemperator which effects the as-designed heat exchanger working fluid flow associated with a steam generator heat exchanger, the resultant attemperated flow causing effects on the inlet gas temperature to the pollution reduction process; and c) altering the flow rate of the re-routed working fluid until the inlet gas temperature to the pollution reduction process falls within, or is as close as possible to, the temperature window of the pollution reduction process.

Implementation of a Control Device

In addition to implementation of procedures involving computer simulations, this invention includes the apparatus of controlling the combustion gas temperature entering the pollution reduction process once the physical hardware, including the pipe containing the re-routed working fluid, has been installed. The combustion gas temperature entering the pollution reduction process is controlled through conventional control techniques. Specifically, an apparatus used to control combustion gas temperature entering a pollution reduction process, the pollution reduction process being located within a steam generator having at least one heat exchanger, said apparatus comprising: 1) a temperature probe measuring the temperature of the combustion gases entering the pollution reduction process, and having a temperature probe output (see FIG. 3, item 301); 2) a control valve having an inlet connection and an outlet connection (see FIG. 3, item 305); 3) an attemperation device placed in the steam generator in such a manner as to effect the outlet enthalpy of at least one heat exchanger (see FIG. 3, item 307, and as compared to FIG. 1), and having an inlet connection for the attemperating fluid; 4) a pipe carrying the re-routed working fluid from a location within the system to the inlet connection of the control valve (see FIG. 3, item 303); 5) a pipe carrying the re-routed working fluid from the outlet connection of the control valve to the inlet connection for the attemperating fluid of the attemperation device (see FIG. 3, item 306); and 6) a control device which controls the temperature of the combustion gases entering the pollution reduction process to a value which lies within a temperature window required for proper operation of the pollution reduction process, having as an input the temperature probe output and having an output signal which instigates control valve movement to achieve changes in the flow rate of the re-routed working fluid thus changes in the temperature of the combustion gases (see FIG. 3, item 331).

SUMMARY

The above described method embodiments teach how the practical application of the present invention to operating steam generators, through modification of working fluid routings, may be achieved through examples of heat transfer studies. These method embodiments are for illustrating the spirit of the present invention, that is to achieve a desired temperature window required by the pollution reduction process, while at the same time minimizing any adverse impact on the steam generator's exit gas temperature and minimizing any adverse impact on system thermal efficiency. Having described these several method embodiments and an example of a re-routing of working fluid, it should be apparent to those skilled in the art that the foregoing is merely illustrative and not limiting, having been presented by way of examples only. Numerous modifications and other embodiments are within the scope of one of ordinary skill in the art and are contemplated as falling within the scope of the invention.

Although the present invention has been described in considerable detail with regard to certain preferred embodiments thereof, other embodiments within the scope of the present invention are possible without departing from the scope, spirit and general industrial applicability of the invention. The aforementioned descriptions of this invention assume that a steam generator's working fluid is water as described in the above referenced *Steam, Its Generation and Use*, however the general procedures of this invention may be applied to any type of working fluid provided the working fluid flows within the heat exchanger tubes as applicable to a conventional design (i.e., hot combustion gases flowing around and outside of the tubes, the working fluid flowing inside the tubes). Further, the number of re-routings of the working fluid needed to achieve a desired temperature window required by the pollution reduction process, while at the same time minimizing any adverse impact on the steam generator's exit gas temperature and minimizing any adverse impact on system thermal efficiency need not be limited, provided the general methods and apparatus considerations as taught herein are followed. Accordingly, the general theme and scope of the appended claims should not be limited to the descriptions of the preferred embodiment disclosed herein.

THE DRAWINGS

FIG. 1 and FIG. 2, in comparison, illustrate the application of this invention. Both illustrate the same steam generator, conventionally fired with a fossil fuel 105, and are discussed by way of the example of this invention (found above). The illustrated steam generator does not employ a Reheat heat exchanger; although the invention is applicable to either a reheat or non-reheat design. Items 101 and 103 are the supplies of fuel and combustion air. Item 109 is the furnace region of the steam generator where the fossil fuel is combusted. Item 117 represents the path of the combustion gases. Item 111 represents the final output from the steam generator (i.e., steam supply to a steam turbine, or other energy consumption process). Item 113 is a Finishing Superheater heat exchanger. Item 115 is a Primary Superheater No. 1. Item 119 is a Primary Superheater No. 2. Item 121 is an Economizer heat exchanger. Item 123 is the steam generator's drum. The steam generator's working fluid enters the system as feedwater, 106, flowing through the Economizer heat exchanger tubes 121; from the Economizer the working fluid flows to the steam generator's water walls 107 and drum 123. Item 125 represents the working fluid flowing from the drum to the heat exchanger tubes of Primary Superheater No. 1, item 115, and then to the heat exchanger tubes of Primary Superheater No. 2, item 119. The working fluid then flows to the heat exchanger tubes of the Finishing Superheater 113. After being heated to final conditions, the working fluid is delivered 111 to an energy consuming process such as a steam turbine. The normal flows entering heat exchangers tubes, such as 113, 115, 119 and 121, when the system is not using a pollution reduction process as in FIG. 1, are herein defined as the "as-designed heat exchanger working fluid flows".

FIG. 2 represents a modification of FIG. 1 in which a pollution reduction process is added to the steam generator, item 117. Its inlet temperature is measured 201. FIG. 2 illustrates the re-routing of a portion of feedwater flow 203 (denoted by an "X" portion of the feedwater flow), through a control valve 205, and then through a pipe 206 to an attemperation device 207. Attemperation device 207 combines the portion of the feedwater flow 206 ("X") with the drum steam flow 225, producing a cooled mixed flow 209. The as-designed heat exchanger working fluid flow exiting the drum is 125 of FIG. 1, whereas in FIG. 2 this flow 225 is reduced by "X" given that the feedwater flow is reduced by "X". The cooled flow 209 is then routed to the Primary Superheater No. 1, item 115, causing cooler combustion gases to enter the pollution reduction process, item 117.

FIG. 3 illustrates control of combustion gas temperatures entering a pollution reduction process by operating a motor operated valve 305, based on measured gas temperature 301, through a temperature controller 331. In FIG. 3 item 317 is the pollution reduction process. Combustion gases are flowing through the steam generator, item 371. Item 303 represents a portion of liquid water or steam used to attemperate the main flow 325 through actuation of control valve 305. This flow exits 305 via pipe 306. The main flow 325 and the attemperating flow 306, flow to an attemperation device 307 producing a combined flow 309 those temperature is changed given the mixing of 325 and 306. The flow 309 is delivered to the heat exchanger 315 in a routine fashion, exiting 315 to continue its routine flow path. Item 315 is a typical heat exchanger upstream of the pollution reduction process. Attemperation devices, also termed desuperheaters, are well known to the steam generation industry and are employed to combine an attemperating flow with an as-designed heat exchanger working fluid flow to produced an attemperated flow whose temperature may be controlled. Given the teachings of this invention, attemperation devices may either cool or heat a main flow 325, and said ability so defines their functionality for the purposes of this invention.

To more fully clarify this invention, for FIG. 2 and FIG. 3 and elsewhere herein, the words "pollution", "pollutant" and "pollutants" in the context of this invention all-are defined as referring to at least one of the substances selected from the group of combustion products consisting of: $NO_X$ (consisting of one or more nitrogen oxide compounds such as NO, $NO_2$, $N_2O_4$, etc); $SO_X$ (consisting of one or more sulfur oxide compounds such as $SO_2$ and/or $SO_3$); and metals (such as mercury). Said pollutants (or pollution) typically being produced from the combustion of coal burnt in steam generators.

To more fully clarify this invention, for all figures and elsewhere herein, if used, the words "obtain", "obtained", "obtaining", "determine", "determined", "determining" or "determination" are defined as measuring, calculating, assuming, estimating or gathering from a data base. The words "establish", "established" or "establishing" are defined as measuring, calculating, assuming, estimating or gathering from a data base. The term "temperature window" refers to a range of combustion gas temperatures, within said range a pollution reduction process operates at optimum efficiency. For example a temperature window could exist from 1300 to 1400° F. for, say, a NOx reduction process, thus if the combustion gases enter the $NO_X$ reduction process at 1340° F., the process is then said to have an optimum efficiency; if entering at 1450° F. the process would not be optimized.

To more fully clarify this invention, for all figures and elsewhere herein, the phrases used above such as: "re-routing of a portion of feedwater flow", "a portion of the working fluid can be routed", "working fluid can be re-routed", "routing of the steam generator's inlet feedwater", and similar expressions taken in context and involving the words "re-routed", "re-routing" or "routed" all mean the diverting a portion of the system's working fluid in pipes, to attemperation devices as seen in FIG. 2 (i.e., pipe 203 leading to attemperator 207), and in FIG. 3 (i.e., pipe 303 leading to attemperator 307); and is defined herein as the "re-routed working fluid". In the context of his invention, the flow in said pipe leading to an attemperator may cause changes to the as-designed heat exchanger working fluid flow. The routing of working fluid from one steam generator region to an attemperation device does not imply physical alternation to the heat exchanger itself. Furthermore, the phrase "attemperation device", or the phrase "attemperator" taken in the context of a device, is a device as illustrated by item 207 in FIG. 2, and by item 307 in FIG. 3. These illustrations show that the attemperation device used by this invention mixes a main flow 325 (i.e. it is placed in the working fluid pathway), receiving an attemperating fluid 306, the resulting mixed flow 309 having obtained a desired temperature and thereby affecting heat transfer 315 from the combustion gas 371 and thus achieving the temperature window required by the pollution reduction process 317. These illustrations clearly indicate that an attemperation device used by this invention is a contact heat exchanger having no surface area indeed modifying a heat exchanger's surface area has no applicability to this invention as previously stated.

The following summarizes and identifies procedural topics associated with and demonstrated by the teachings of this invention, its FIG. 2 and FIG. 3, and specific descriptions used and definitions made herein. In addition, as many of these topics are broadly discussed throughout the teachings herein, the following is not meant to be inclusive:

obtaining the temperature window of the pollution reduction process is discussed throughout the BACKGROUND section;

obtaining a system thermal efficiency of the steam generator before application of the pollution reduction process resulting in a design system thermal efficiency is discussed in the BACKGROUND section and in the section entitled "Implementation of Methods";

performing an engineering study of the steam generator resulting in identification of a source and destination of a re-routed working fluid based on achieving the temperature window is demonstrated in section entitled "Implementation of Methods", noting its reference to sections entitled "First and Rudimentary Method Embodiments", "Second Method Embodiment" and "Third Method Embodiment";

modifying the steam generator with the re-routed working fluid based on results of the engineering study is demonstrated by examination of FIG. 1 and FIG. 2 indicating the added pipe of FIG. 2 carrying the re-routed working fluid (see FIG. 2, item 203); and adjusting the flow rate of the re-routed working fluid until the temperature of combustion gases entering the pollution reduction process lie within the temperature window is discussed in the sections entitled "Implementation of Methods" and "Implementation of a Control Device".

What is claimed is:

1. An apparatus used in a fossil-fired system to control the temperature of combustion gases entering pollution reduction equipment, said fossil-fired system heating a working fluid with combustion gases in at least one heat exchanger, the working fluid having a working fluid pathway through the system, the apparatus comprising:

a pollution reduction equipment having a temperature window required for proper operation;

a heat exchanger upstream from the pollution reduction equipment disposed in the working fluid pathway;

a temperature probe measuring the temperature of the combustion gases entering the pollution reduction equipment, and having a temperature probe output;

a control valve having an inlet connection and an outlet connection;

a pipe carrying a re-routed working fluid from a location within the system to the inlet connection of the control valve;

an attemperation device disposed in the working fluid pathway and upstream from the heat exchanger, having an inlet connection for attemperating fluid;

a pipe carrying the re-routed working fluid from the outlet connection of the control valve to the inlet connection for attemperating fluid; and a control device which controls the temperature of the combustion gases entering the pollution reduction equipment to a value which lies within the temperature window required for proper operation of the pollution reduction equipment, having as an input the temperature probe output, and having an output signal which actuates the control valve to achieve changes in the flow rate of the re-routed working fluid resulting in controlling the temperature of the combustion gases.

2. The apparatus of claim 1 wherein the temperature probe includes a Resistance Temperature Detector, also termed RTD, for measuring the temperature of the combustion gases entering the pollution reduction equipment, and having a temperature probe output.

3. The apparatus of claim 1 wherein the temperature probe includes a thermocouple for measuring the temperature of the combustion gases entering the pollution reduction equipment, and having a temperature probe output.

4. The apparatus of claim 1 wherein the temperature probe includes an infrared based detector for measuring the temperature of the combustion gases entering the pollution reduction equipment, and having a temperature probe output.

5. The apparatus of claim 1 wherein the control device which controls the temperature of the combustion gases includes a Proportional Integral Derivative controller device, also termed PID.

6. The apparatus of claim 1 wherein the control device which controls the temperature of the combustion gases includes a pneumatic control device.

7. A method for controlling the temperature of combustion gases entering a pollution reduction process when such a process is applied to a steam generator burning fossil fuel having at least one heat exchanger, the method comprising the steps of:
- obtaining a temperature window of the pollution reduction process;
- using a heat transfer study of the steam generator resulting in identification of a source and destination of a re-routed working fluid based on achieving the temperature window;
- modifying the steam generator with the re-routed working fluid based on the heat transfer study;
- measuring a temperature of the combustion gases entering the pollution reduction process; and
- adjusting the re-routed working fluid flow rate until the temperature of combustion gases entering the pollution reduction process lies within the temperature window.

8. The method of claim 7 wherein the step of using the heat transfer study of the steam generator comprises:
- using a computer program resulting in identification of a source and destination of a re-routed working fluid based on achieving the temperature window.

9. The method of claim 8 wherein the step of performing the heat transfer study of the steam generator comprises:
- obtaining a system thermal efficiency of the steam generator before application of the pollution reduction process resulting in a design system thermal efficiency.

10. A method for controlling the temperature of combustion gases entering a pollution reduction process when such a process is applied to a steam generator burning fossil fuel having at least one heat exchanger, the method comprising the steps of:
- obtaining a temperature window of the pollution reduction process;
- performing a heat transfer study of the steam generator resulting in identification of a source and destination of a re-routed working fluid based on achieving the temperature window;
- modifying the steam generator with the re-routed working fluid based on the heat transfer study;
- measuring a temperature of the combustion gases entering the pollution reduction process; and
- adjusting the re-routed working fluid flow rate until the temperature of combustion gases entering the pollution reduction process lies within the temperature window.

11. The method of claim 10 wherein the step of performing the heat transfer study of the steam generator comprises:
- using a computer program resulting in identification of a source and destination of a re-routed working fluid based on achieving the temperature window.

* * * * *